(12) United States Patent
Cavagna et al.

(10) Patent No.: US 12,345,303 B2
(45) Date of Patent: Jul. 1, 2025

(54) BRAKING BAND OF A DISC FOR DISC BRAKE OF VENTILATED TYPE

(71) Applicant: BREMBO S.p.A., Curno (IT)

(72) Inventors: Lorenzo Cavagna, Curno (IT); Nino Ronchi, Curno (IT)

(73) Assignee: Brembo S.p.A., Curno (IT)

( * ) Notice: Subject to any disclaimer, the term of this patent is extended or adjusted under 35 U.S.C. 154(b) by 14 days.

(21) Appl. No.: 17/769,362

(22) PCT Filed: Oct. 14, 2020

(86) PCT No.: PCT/IB2020/059646
§ 371 (c)(1),
(2) Date: Apr. 15, 2022

(87) PCT Pub. No.: WO2021/074811
PCT Pub. Date: Apr. 22, 2021

(65) Prior Publication Data
US 2024/0133436 A1 Apr. 25, 2024
US 2024/0229880 A9 Jul. 11, 2024

(30) Foreign Application Priority Data

Oct. 17, 2019 (IT) .................. 102019000019160

(51) Int. Cl.
*F16D 65/12* (2006.01)
*F16D 65/02* (2006.01)

(52) U.S. Cl.
CPC .... *F16D 65/128* (2013.01); *F16D 2065/1308* (2013.01); *F16D 2065/1328* (2013.01)

(58) Field of Classification Search
CPC .................................................. F16D 65/128
(Continued)

(56) References Cited

U.S. PATENT DOCUMENTS 3,983,973 A 10/1976 Zboralski et al.
4,523,666 A 6/1985 Murray
(Continued)

FOREIGN PATENT DOCUMENTS

CN 108412917 A 8/2018
DE 102004056645 A1 6/2006
(Continued)

OTHER PUBLICATIONS

European Patent Office, International Search Report, issued in PCT/IB2020/059646, Nov. 30, 2020, Rijswijk, NL.
(Continued)

*Primary Examiner* — Melanie Torres Williams
(74) *Attorney, Agent, or Firm* — Marshall & Melhorn, LLC

(57) ABSTRACT

A braking band extending between an inner diameter and an outer diameter has two plates facing each other and having inner surfaces delimiting a gap. The two plates are joined by connecting elements projecting from one of the two plates and reaching the opposite plate. A first series of fins of the connecting elements is each a fin which is in a single piece and extends from near the inner diameter to near the outer diameter and has a fin outer end portion having a predetermined extension along an outer circumferential width, and a fin inner end portion having a predetermined extension along an inner circumferential width. Considering a section taken along a section plane including the radial and circumferential directions, the outer circumferential width is greater than the inner circumferential width and the fin outer end portion of each fin faces only an adjacent fin on both sides in circumferential direction.

11 Claims, 15 Drawing Sheets

(58) Field of Classification Search
USPC .................................................. 188/264 A
See application file for complete search history.

(56) References Cited

U.S. PATENT DOCUMENTS

| | | | |
|---|---|---|---|
| 4,865,167 A | 9/1989 | Giorgetti et al. | |
| 4,867,284 A | 9/1989 | Okamura et al. | |
| 5,004,078 A | 4/1991 | Oono et al. | |
| 5,542,503 A | 8/1996 | Dunn et al. | |
| 6,131,707 A | 10/2000 | Buechel et al. | |
| 6,145,636 A | 11/2000 | Ikari et al. | |
| 6,325,185 B1 | 12/2001 | Doi et al. | |
| 6,367,598 B1 * | 4/2002 | Sporzynski | F16D 65/12 188/218 XL |
| 6,367,599 B2 | 4/2002 | Kobayashi | |
| 6,457,566 B1 * | 10/2002 | Toby | F16D 65/12 188/218 XL |
| 7,066,306 B2 | 6/2006 | Gavin | |
| 7,267,210 B2 | 9/2007 | Cornolti et al. | |
| 7,934,586 B1 * | 5/2011 | Black | F16D 65/123 188/218 XL |
| 9,709,110 B2 * | 7/2017 | Sabeti | F16D 65/128 |
| 9,841,073 B2 * | 12/2017 | Noriega Gonzalez | F16D 65/128 |
| 2004/0124047 A1 | 7/2004 | Oberti et al. | |
| 2006/0219500 A1 | 10/2006 | Lu et al. | |
| 2006/0243546 A1 | 11/2006 | Oberti et al. | |
| 2007/0261929 A1 | 11/2007 | Hsu et al. | |
| 2009/0000884 A1 | 1/2009 | Layton et al. | |
| 2009/0035598 A1 | 2/2009 | Hanna et al. | |
| 2010/0122880 A1 | 5/2010 | Hanna et al. | |
| 2012/0111692 A1 | 5/2012 | Chern et al. | |
| 2012/0175199 A1 * | 7/2012 | Chern | F16D 65/092 188/73.37 |

FOREIGN PATENT DOCUMENTS

| | | |
|---|---|---|
| DE | 202006017092 U1 | 2/2007 |
| DE | 102013210700 A1 | 12/2014 |
| DE | 202015102580 U1 | 10/2015 |
| EP | 0318687 A2 | 6/1989 |
| EP | 1433973 A1 | 6/2004 |
| EP | 1373751 B1 | 2/2007 |
| EP | 2192321 A1 | 6/2010 |
| EP | 2276946 B1 | 10/2011 |
| EP | 2715179 B1 | 7/2015 |
| EP | 2100051 B1 | 9/2015 |
| EP | 2145119 B1 | 12/2016 |
| EP | 2507108 B1 | 6/2017 |
| EP | 3421833 A1 | 1/2019 |
| EP | 3084256 B1 | 3/2020 |
| GB | 2060796 A | 5/1981 |
| GB | 2076090 A | 11/1981 |
| GB | 2286438 A | 8/1995 |
| IT | 1273754 B | 7/1997 |
| JP | 2005240876 A | 9/2005 |
| SI | 23474 A | 3/2012 |
| WO | WO-9950109 A1 * | 10/1999 ......... F16D 65/0006 |
| WO | 02064992 A2 | 8/2002 |
| WO | 2004102028 A1 | 11/2004 |
| WO | 2006105131 A2 | 10/2006 |
| WO | 2007092116 A1 | 8/2007 |
| WO | 2008078352 A1 | 7/2008 |
| WO | 2011058594 A1 | 5/2011 |
| WO | 2015092671 A1 | 6/2015 |
| WO | 2016020820 A1 | 2/2016 |
| WO | 2017153873 A1 | 9/2017 |
| WO | 2017153902 A1 | 9/2017 |

OTHER PUBLICATIONS

Pan et al., Journal of Beijing Jiaotong University, Numerical simulation for train brake disc ventilation, vol. 39, No. 1, Feb. 2015.
Pan et al., Journal of Beijing Jiaotong University, Numerical simulation for train brake disc ventilation, vol. 39, No. 1, Feb. 2015, English Translation.

* cited by examiner

BRAKING BAND OF A DISC FOR DISC BRAKE OF VENTILATED TYPE

CROSS-REFERENCE TO RELATED APPLICATIONS

This application is a National Phase Application of PCT International Application No. PCT/IB2020/059646, having an International Filing Date of Oct. 14, 2020 which claims priority to Italian Application No. 102019000019160 filed Oct. 17, 2019, each of which is hereby incorporated by reference in its entirety.

FIELD OF THE INVENTION

The present invention relates to a braking band, a ventilated disc for disc brake, particularly, but not exclusively, for applications in the automotive field, and a vehicle having said ventilated disc.

PRIOR ART

In a disc brake, the brake caliper is generally arranged straddling the outer peripheral margin of a brake disc, adapted to rotate about a rotation axis (A-A) defining an axial direction (X-X). In a brake disc, a radial direction (R-R) is further defined, substantially orthogonal to said axial direction (X-X), and a circumferential direction (C-C), orthogonal to said axial direction (X-X), to said radial direction (R-R) and a tangential direction (T-T) locally, or rather precisely, i.e. in an intersection point of an axial and radial direction, orthogonal both to said axial direction (X-X) and to said radial direction (R-R).

As known, discs for disc brake comprise a bell adapted to associate the disc with a hub of a vehicle, from which an annular portion, named a braking band, which is intended to cooperate with brake pads of a caliper, extends. In the case of discs of ventilated type, the braking band is made by means of two plates facing and connected to each other by means of connecting elements, respectively, e.g. in the shape of pins or fins. The outer surfaces of the two plates define opposite braking surfaces, while the inner surfaces, together with the pins or fins, delimit ventilation channels for cooling the disc, which channels are crossed by airflows according to a centrifugal direction during the rotary motion of the disc itself.

Said braking band is intended to cooperate with disc brake calipers adapted to apply a braking action on the vehicle by applying, by means of the aforesaid pads, friction on opposite surfaces of the two plates, named braking surfaces.

It is known that during the operation of the brakes, the friction between the pads of the brake calipers and the braking surfaces of the braking band generates a high amount of heat which requires disposal.

The heat generated indeed causes several undesired phenomena, such as, for example, the deformation of the braking band, the formation of cracks on the braking surfaces or localized transformations of state of the material forming the braking band, which result in the deterioration of the braking band itself, in turn.

In applications on high-performance motor vehicles with an increased braking efficiency, in particular, there is much energy to be disposed of, and the aforesaid need to dispose of the heat generated during the braking action is even more felt.

Ventilated discs of the type mentioned above have undergone a continuous evolution over time, in particular concerning the number and shape of the so-called ventilation channels, thus defining the gap which is formed by the two plates axially facing each other.

Among said known ventilated discs, the so-called "pin discs" have shown to be particularly efficient in terms of heat disposal performance, i.e. cooling in which discs the ventilation channels are limited internally by particular column connecting elements, having limited or substantially slightly different comparable radial and circumferential extension with respect to the axial extension thereof, definable as "pins" which transversely connect the two plates.

For example, ventilated "pin discs" are known from EP 1 373 751 B1, in which the pins geometrically are arranged along three concentric circumferences which are coaxial to the disc and of a different radius, to form three "ranks"; if cross-sectioned on a plane parallel to the two plates and median with respect thereto, the pins have different types of cross-sections (e.g. "rhomboidal" cross-section pins in the intermediate and inner lines; "drop-shaped" pins in the outer line).

Other ventilated discs with "pin" structures are known, for example, from WO 2004/102028 and U.S. Pat. No. 5,542,503.

The so-called "fin" or "wing" discs are known among ventilated discs, in which the ventilation channels are limited internally by particular connecting elements elongated along a prevalent direction, e.g. directed according to a direction parallel to the radial direction (R-R), or spiral-like which transversely connect the two plates.

It is also known that the braking action provided by the pads against the braking surfaces of the disc generates heat, consequently an increase of temperature of the disc to the extent of making the disc itself incandescent in the case of particularly demanding performance. The disc is deformed and the contact between the pads and the braking surfaces deteriorates due to the increased temperature reached by the disc during the braking. Furthermore, the friction material of the pads undergoes a kind of vitrification and pollution by the disc material.

It has further been found that the higher temperature is reached at a middle annular portion of the braking surfaces, i.e. at a middle annular portion of the outer surfaces of the respective plates. Such a zone is easily subject to the formation of cracks over the course of the life of the disc.

To obviate the above-disclosed drawbacks, the need is particularly felt in the field, on the one hand, to increase the dispersion efficiency of the heat generated by the braking to contain the temperatures reached by the disc during and following the braking, and the need, on the other hand, to increase the mechanical resistance of these middle portions of the braking band.

Solutions are disclosed in WO 2004/102028 and also in WO 2002/064992, U.S. Pat. Nos. 7,066,306, 7,267,210, US 2006 0243546, US 2004 0124047, U.S. Pat. Nos. 6,367,599, 5,542,503 and 4,865,167. Although satisfactory from various points of view, these known solutions do not make to possible to achieve a compromise between the desired mechanical resistance in the middle annular zone of the braking band and the contrasting need to maximize, in the same zone, the air flow capable of removing the significant localized increase of temperature caused by the braking action.

However, it is worth noting that ventilated discs of the type mentioned do not in themselves provide a solution to a further problem which may affect the disc brakes, in particular, disc brakes with ventilated discs, arising simultaneously to the problem mentioned above and which is to be resolved at the same time. The problem is briefly described hereinbelow.

As known, during the operation of the brakes, the disc and the braking bands, in particular, may mechanically vibrate at correlated various frequencies at the various natural vibration modes of the disc itself. Such disc vibrations may result, for example, from resonances triggered by vibrations of objects mechanically coupled to the disc which are biased in the step of braking, should the vibration frequencies of such objects be coincident with or sufficiently close to the natural vibration frequencies of the disc.

It is also known that the aforesaid vibrations cause an audible noise, in particular in the form of annoying squeals when the resonance frequencies are in the audible range (e.g. between 2 and 9 kHz, with subsequent more or less shrill squeals).

Consequently, the need arises to devise solutions to reduce or eliminate such squeals by means of constructive measures which "shift" the vibration frequencies of the disc to values other than the excited ones.

Some solutions are known for discs with different structures from aforesaid "pin" structures.

For example, IT 1 273 754 has braking bands with projections protruding into the inner part of the plates, towards the gap between the two plates, in particular positions and with masses which were specifically identified to reduce the arising vibrations and the subsequent noise.

Other ventilated discs with structures adapted to reduce annoying vibrating phenomena are known, e.g. from U.S. Pat. No. 4,523,666.

Document U.S. Pat. No. 3,983,973 by Knorr-Bremse GmbH shows a brake disc comprising a pair of friction plates spaced apart from each other to form a ventilation channel. A braking force may be applied against said plates by means of a braking lining of brake pads. The two plates are interconnected by a plurality of flow guide ribs or fins to define ventilation passages between the friction plates. Strips of anti-vibrating material are positioned in radial grooves formed in the mutually facing surfaces of the friction plates. These inserts consist of metal elements, which damp the vibrations and have a greater expansion coefficient than that of the ferrous material with which the friction plates are made, such as lead, bronze, or copper.

A similar solution is known from US2009035598.

It is known from document US2012111692 to couple passive dampers of the Squawk type with the braking device to reduce the vibrations.

From solutions U.S. Pat. No. 6,131,707, WO2016020820, WO2017153902, WO2017153873, EP0318687, WO2011058594, WO2006105131, US2006219500, U.S. Pat. No. 6,145,636, US2010122880, U.S. Pat. Nos. 6,325, 185, 4,523,666, 5,004,078, SI23474, GB2060796, DE102013210700, EP3421833, WO2015092671, GB2286438, DE102004056645, EP2192321, WO2008078352, U.S. Pat. No. 3,983,973, DE202006017092, US20090000884, DE202015102580, EP3084256, EP2507108, EP2276946, EP2145119, EP2100051, WO200792116, WO2004102028, EP1433973 it is known to provide connections between the braking band plates circumferentially distributed in non-uniform manner to reduce the natural vibrations excited by the braking action and increase the ventilation in the gap.

However, these distributions of the connecting elements of the plates create structural unevenness capable, in some situations of the braking action, of generating entirely unwanted stress concentrated in the braking band.

Therefore, the need has arisen for new ventilated disc structures which concurrently offer both particularly efficient cooling performance and properties of minimizing vibrations and noise in the step of braking, and while avoiding to cause concentrated stresses in the braking band which could compromise the integrity and duration thereof.

The aforesaid known examples of ventilated discs and respective braking bands are not capable of adequately meeting all the strongly desired requirements mentioned.

Document EP 2 715 179 B1 by the same Applicant, partly solves these problems and in particular aims at reducing the natural frequencies of the vibration modes of the braking band which involve vibrations outside the plane of the plates of the band itself. In particular, this solution has shaped pins, which protrude into the gap between connecting elements.

This known solution, although satisfactory from many points of view, does not completely solve the problem and, in particular, has highlighted the need to find solutions, which make it possible to easily create the shape of the surfaces which delimit the gap between the braking band.

Therefore, the need is still strongly felt to increase the mass of the braking band near its outer edge, to reduce the natural vibration modes of the braking band of the out of plane type, which, when excited, have a very negative effect on brake performance.

In particular, the need is felt to devise a shape of the connecting elements of the braking band plates which makes it possible to reduce the amplitude of the most annoying natural vibration modes of the braking band, particularly in the sense of their specific frequency.

Therefore, the problem underlying the present invention is to provide a braking band and a disc for brake disc, which have structural and functional features such to satisfy the aforementioned requirements and, at the same time, solve the drawbacks mentioned with reference to the prior art and satisfy the aforesaid felt needs.

Solution

It is the object of the present invention to provide a braking device in which the tendency to create these vibratory waves and consequent squeals is reduced.

This and other purposes and advantages are achieved by a braking band, a disc brake disc and a vehicle as described and claimed herein.

Some advantageous embodiments are the object of the dependent claims.

From the analysis of this solution, it has emerged how the suggested solution allows a much superior braking comfort to be achieved with respect to solutions of the prior art, therefore a reduction of the vibrations, and in particular an absence of vibrations resulting in squeals.

Moreover, the suggested solution maintains a disc cooling efficiency which is very high and even improved in some embodiments; for example, the efficiency is greatly improved by virtue of the increased air flow turbulence through the gap of the braking band, turbulence which is determined by the specific shape of the fins present between the plates.

Furthermore, the suggested solutions make it possible to increase the mass of the braking band and stiffen radial portions of the braking band, in particular increasing the mass near the radially outer edge of the braking band, to reduce the natural vibration modes of the braking band of the out of plane type which very negatively affect the performance of the brake when excited.

Even further, by virtue of the suggested solutions, it is possible to ensure greater uniformity of mass distribution by virtue of the fins enlarged in their radially outer portion and the short fins extended only partially from the inner band diameter towards the inside of the gap, especially near the inner edge of the disc, thereby simplifying the production process.

Furthermore, by virtue of the suggested solutions, it is possible to avoid a large annular area of the hollow gap empty from connecting elements, thus avoiding a poor temperature distribution on the braking band, such as to generate a vibration of the disc or another imbalance phenomenon.

Furthermore, by virtue of the suggested solutions, by virtue of the enlarged base of the fins near the outer band diameter, it is possible to increase the mass close to the outer edge avoiding, at the same time, the occlusion or excessive restriction of the ventilation channel and, at the same time, structurally strengthening the band to limit the formation and propagation of cracks.

Furthermore, by virtue of the suggested solutions, it is possible to ensure an increase in thermal breakage resistance.

Furthermore, by virtue of the suggested solutions, it is possible to ensure elongated and enlarged fins in their radially outer portion able to further increase the surface area available for the heat exchange.

FIGURE

Further features and advantages of the device, of the brake disc and of the vehicle will be apparent from the following description of preferred embodiments thereof, by way of non-limiting examples, with reference to the accompanying figures, in which.

DESCRIPTION OF SOME PREFERRED EMBODIMENTS

Figure 1:
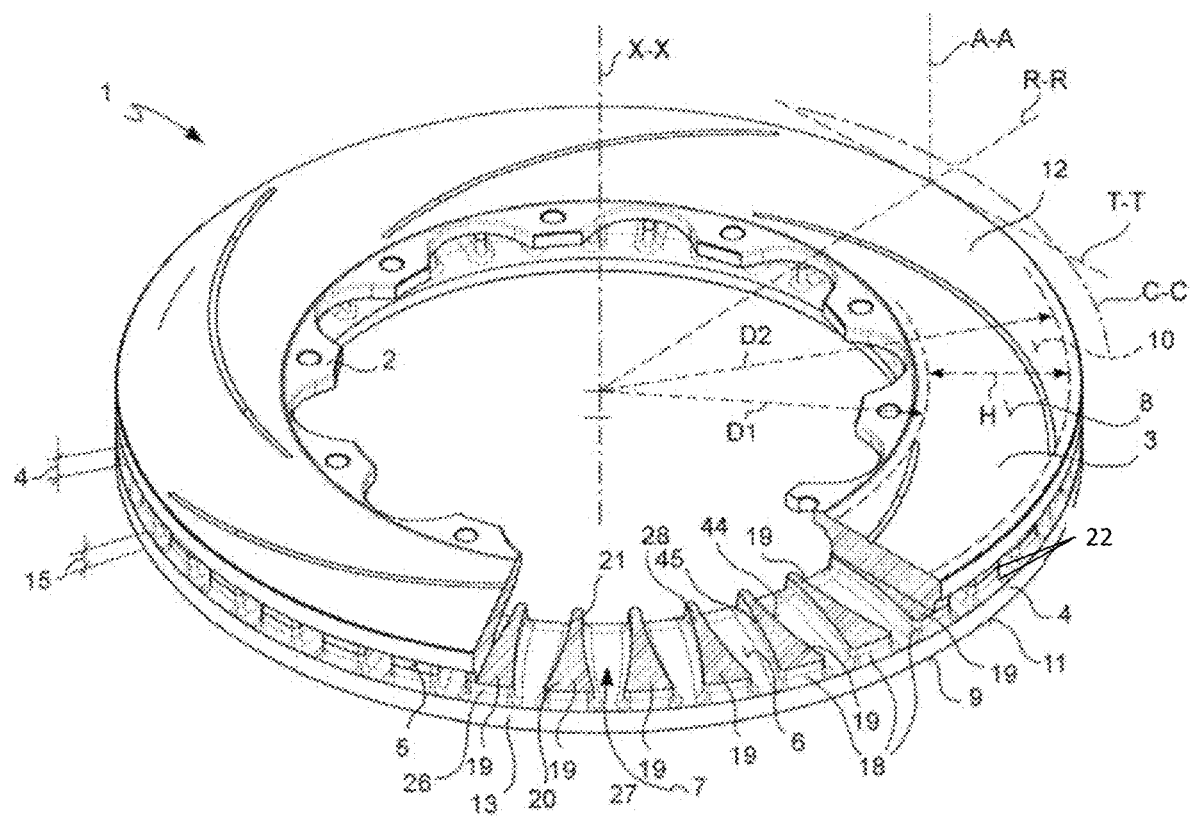
FIG. 1 is a partially sectioned axonometric view of a disc brake disc with a braking band according to the present invention.
Figure 2:
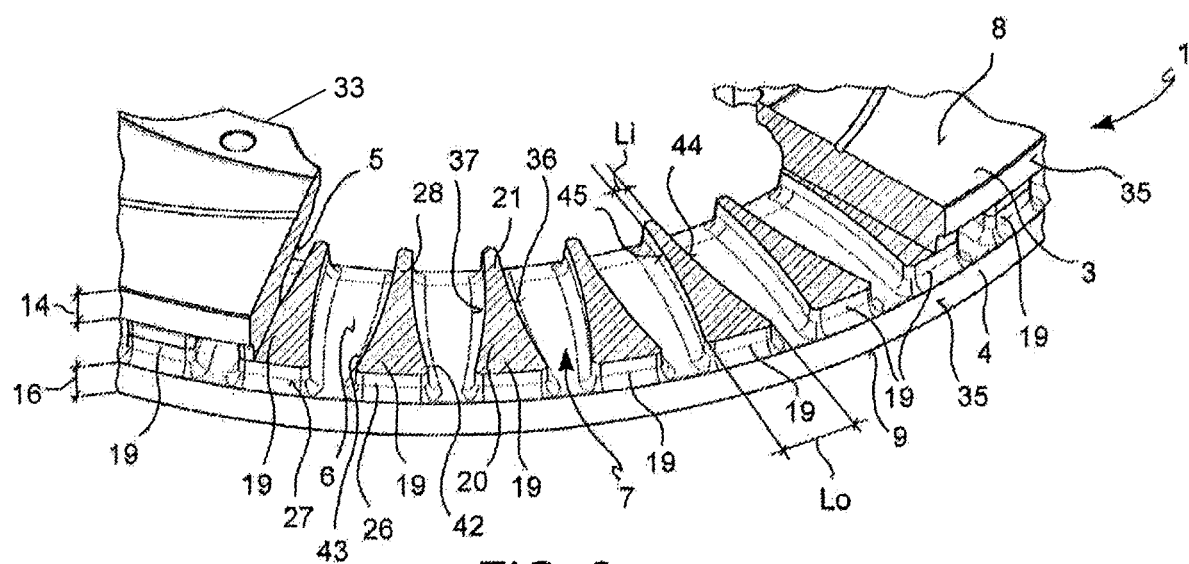
FIG. 2 is an axonometric view of an enlarged detail of the braking band section in FIG. 1, showing the tapered fins with mutually converging curved sides.
Figure 3:
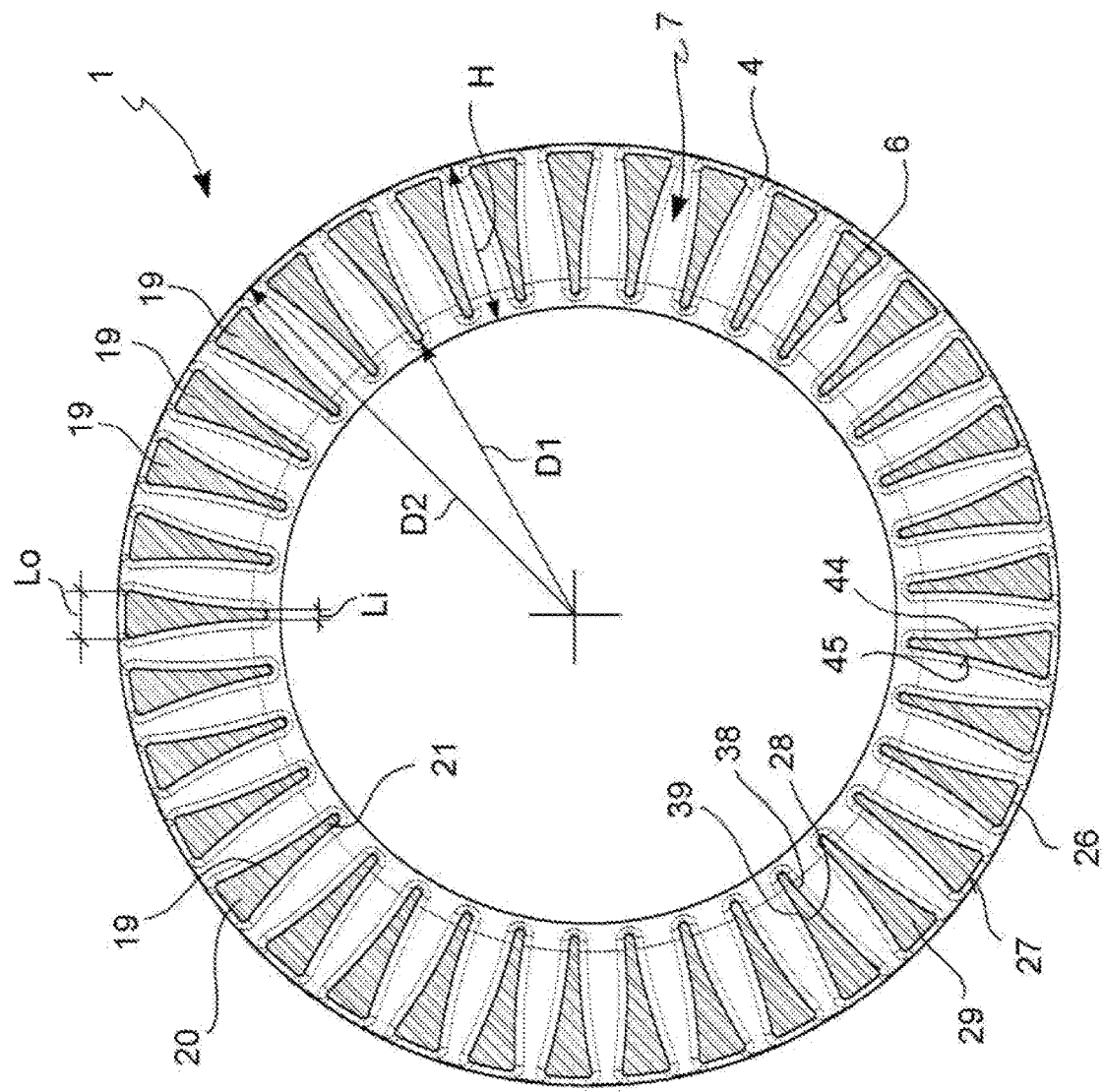
FIG. 3 shows a sectioned plan view taken along a medium plane of fluid flow through the gap of the braking band in FIG. 1.
Figure 4:
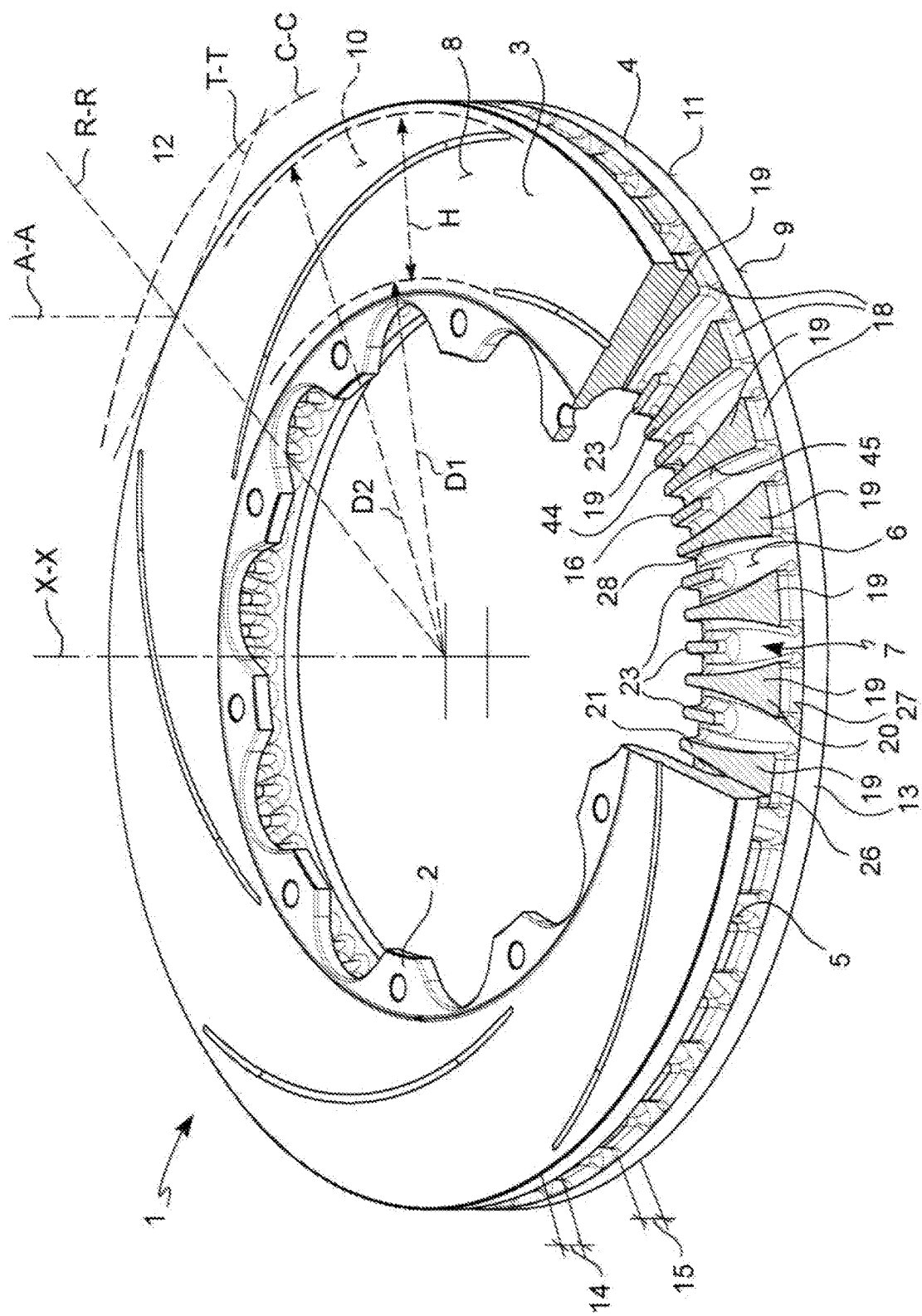
FIG. 4 is a partially sectioned axonometric view of a disc brake disc with a braking band according to the present invention.
Figure 5:
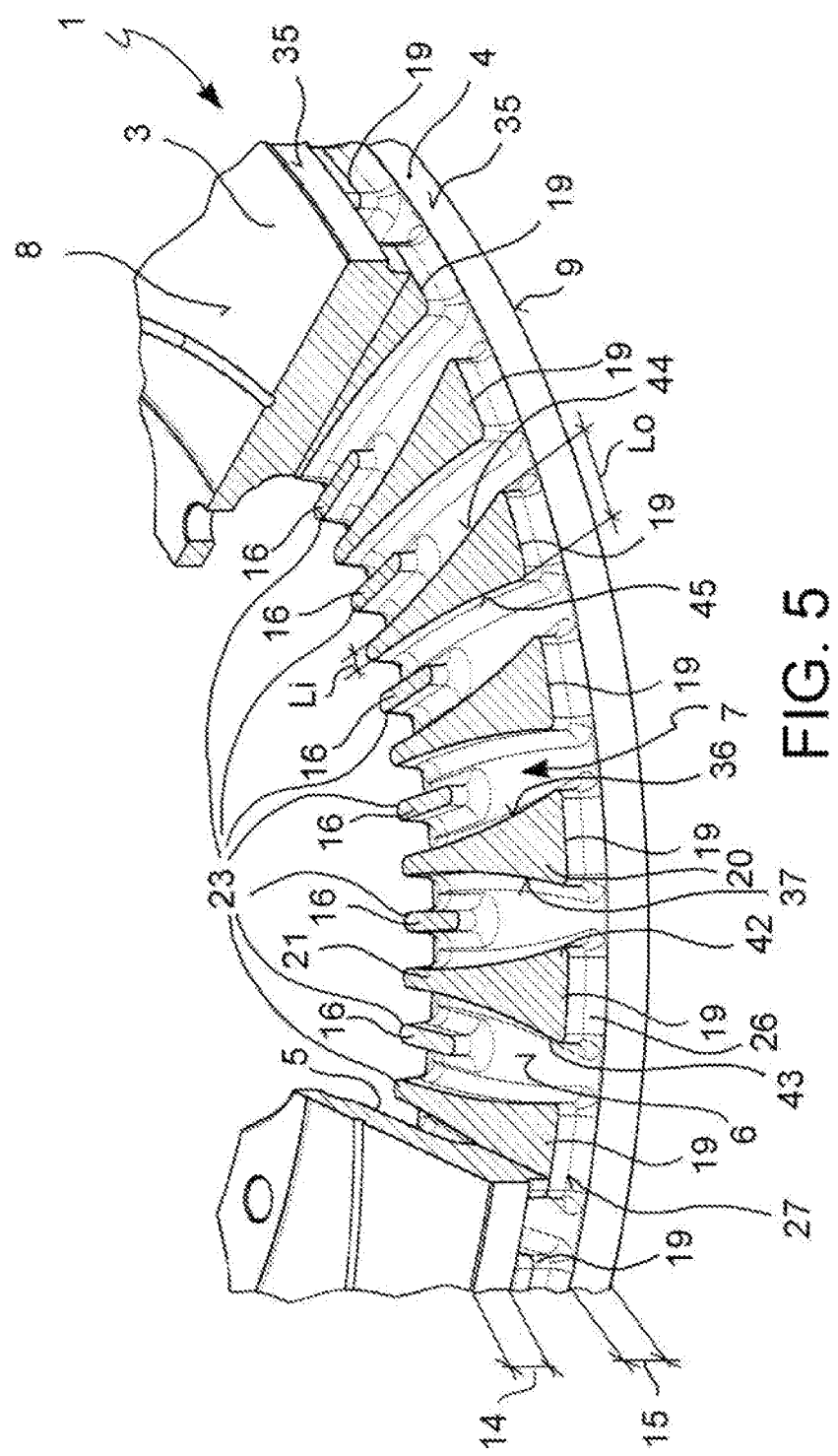
FIG. 5 is an axonometric view of an enlarged detail of the braking band section in FIG. 4, showing the tapered fins with mutually converging curved sides and interposed short fins with extension limited to at most ⅓ of the band height.
Figure 6:
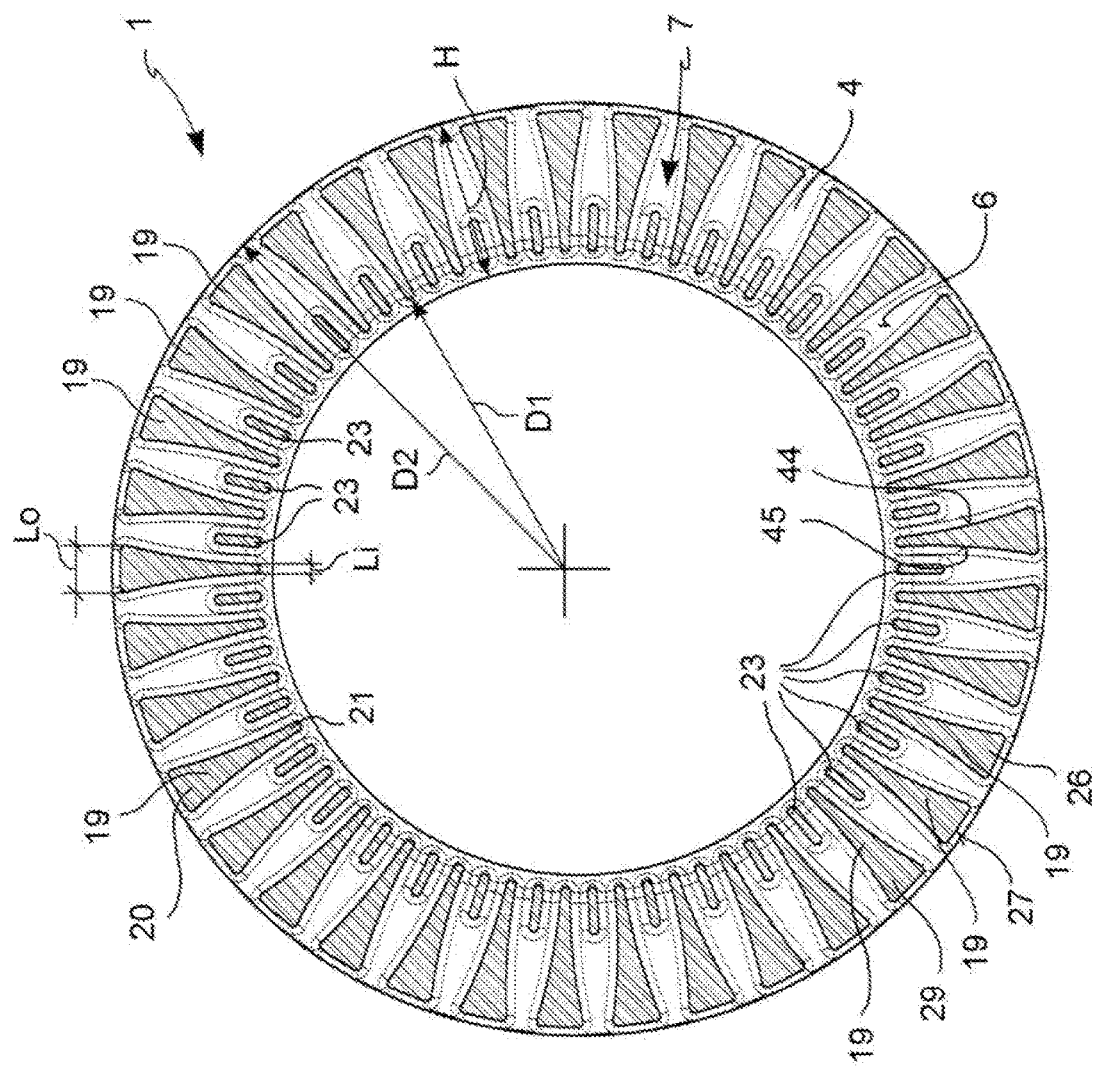
FIG. 6 shows a sectioned plan view taken along a medium plane of fluid flow through the gap of the braking band in FIG. 4.
Figure 7:
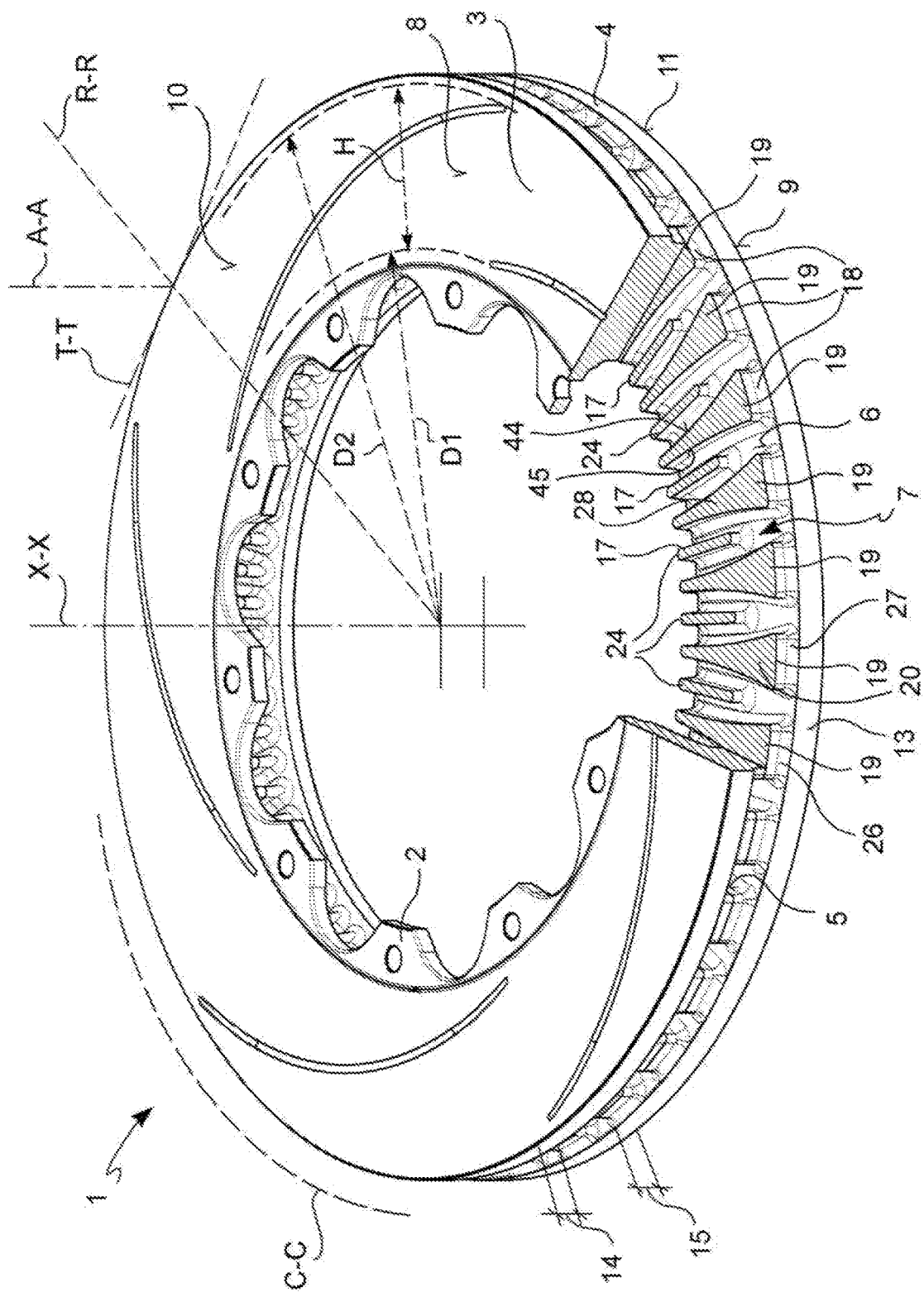
FIG. 7 is a partially sectioned axonometric view of a disc brake disc with a braking band according to the present invention.
Figure 8:
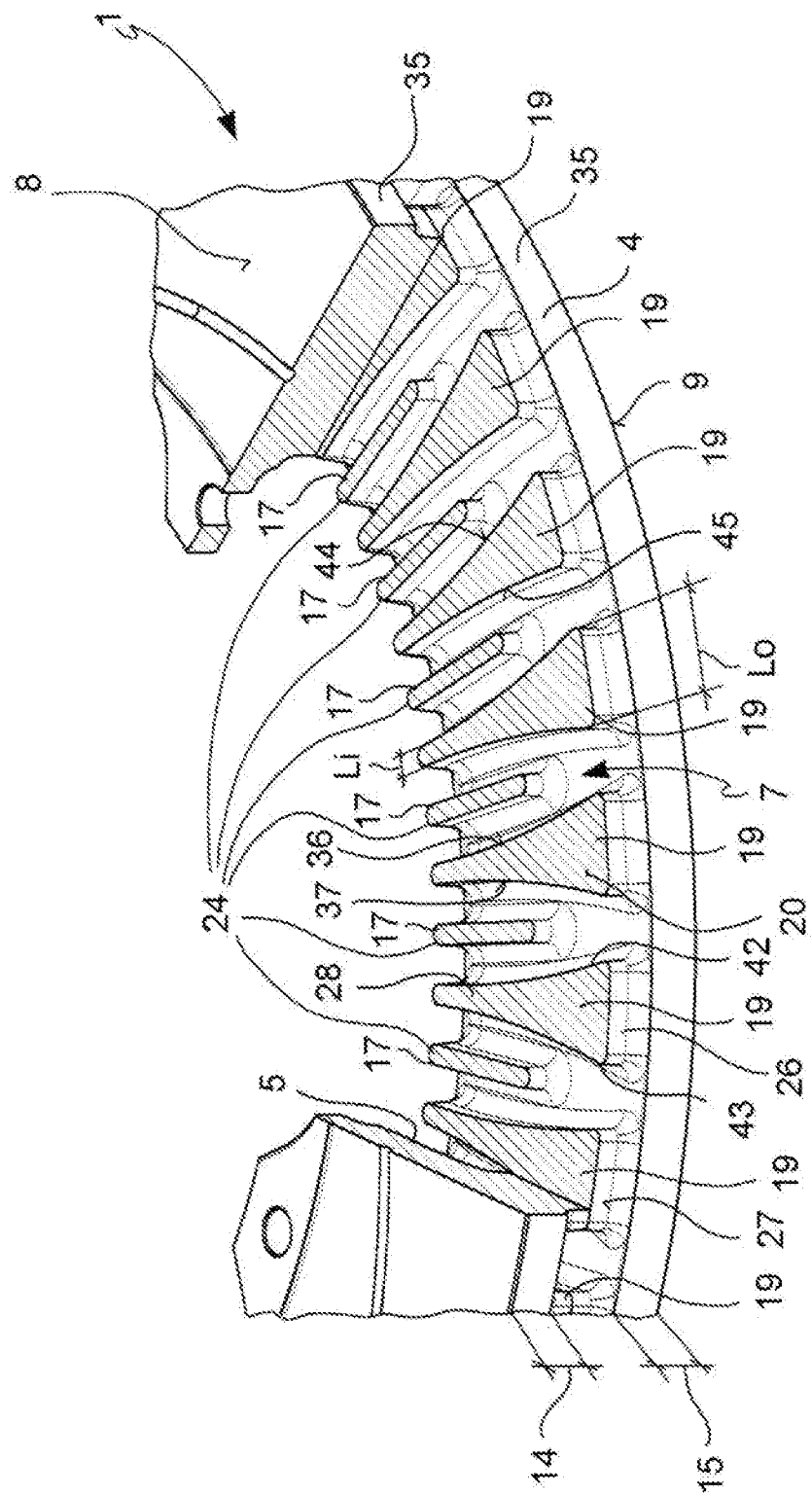
FIG. 8 is an axonometric view of an enlarged detail of the braking band section in FIG. 7, showing the tapered fins with mutually converging curved sides and interposed short fins with extension limited to at most ½ of the band height.
Figure 9:
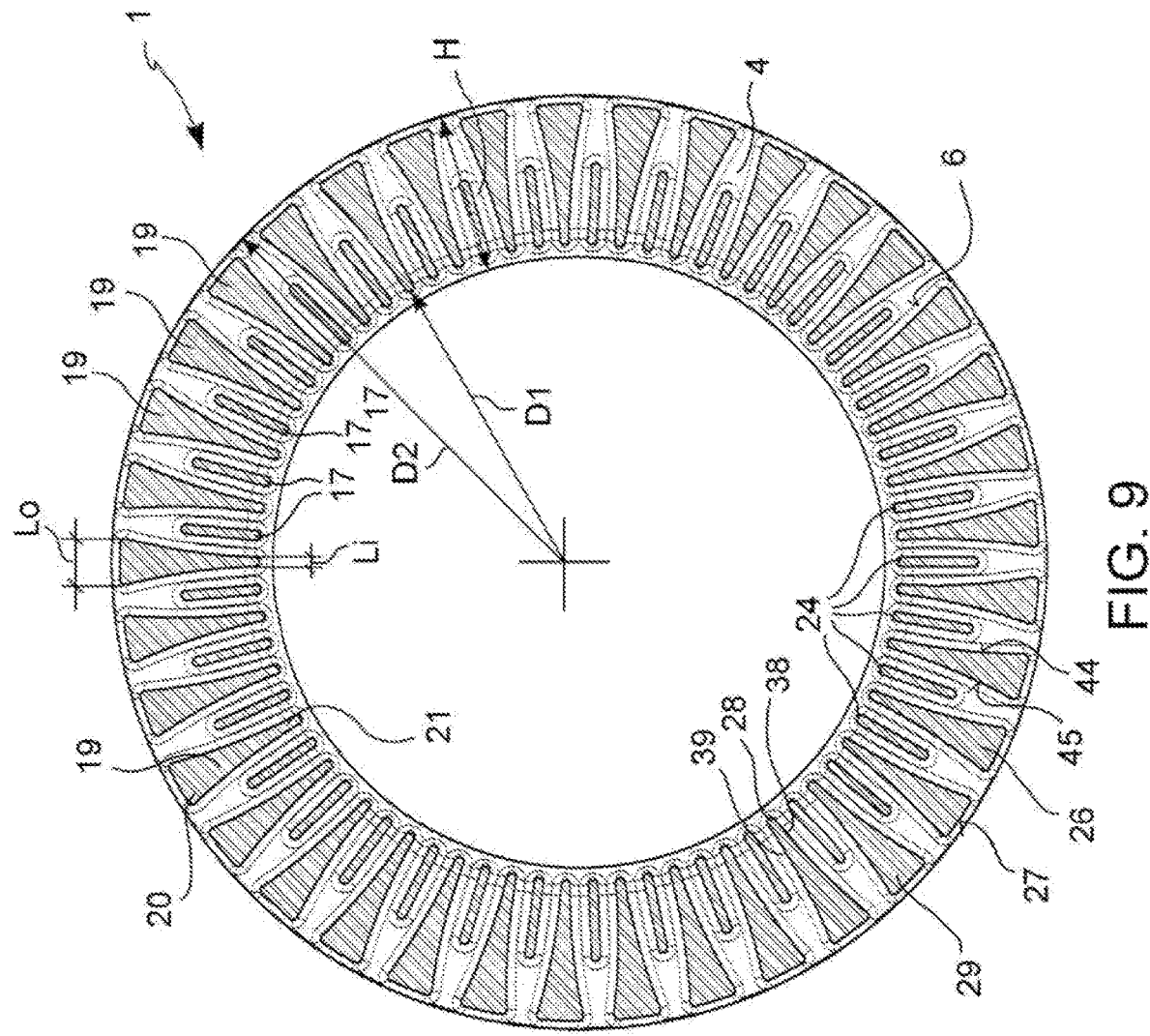
FIG. 9 shows a sectioned plan view taken along a medium plane of fluid flow through the gap of the braking band in FIG. 7.
Figure 10:
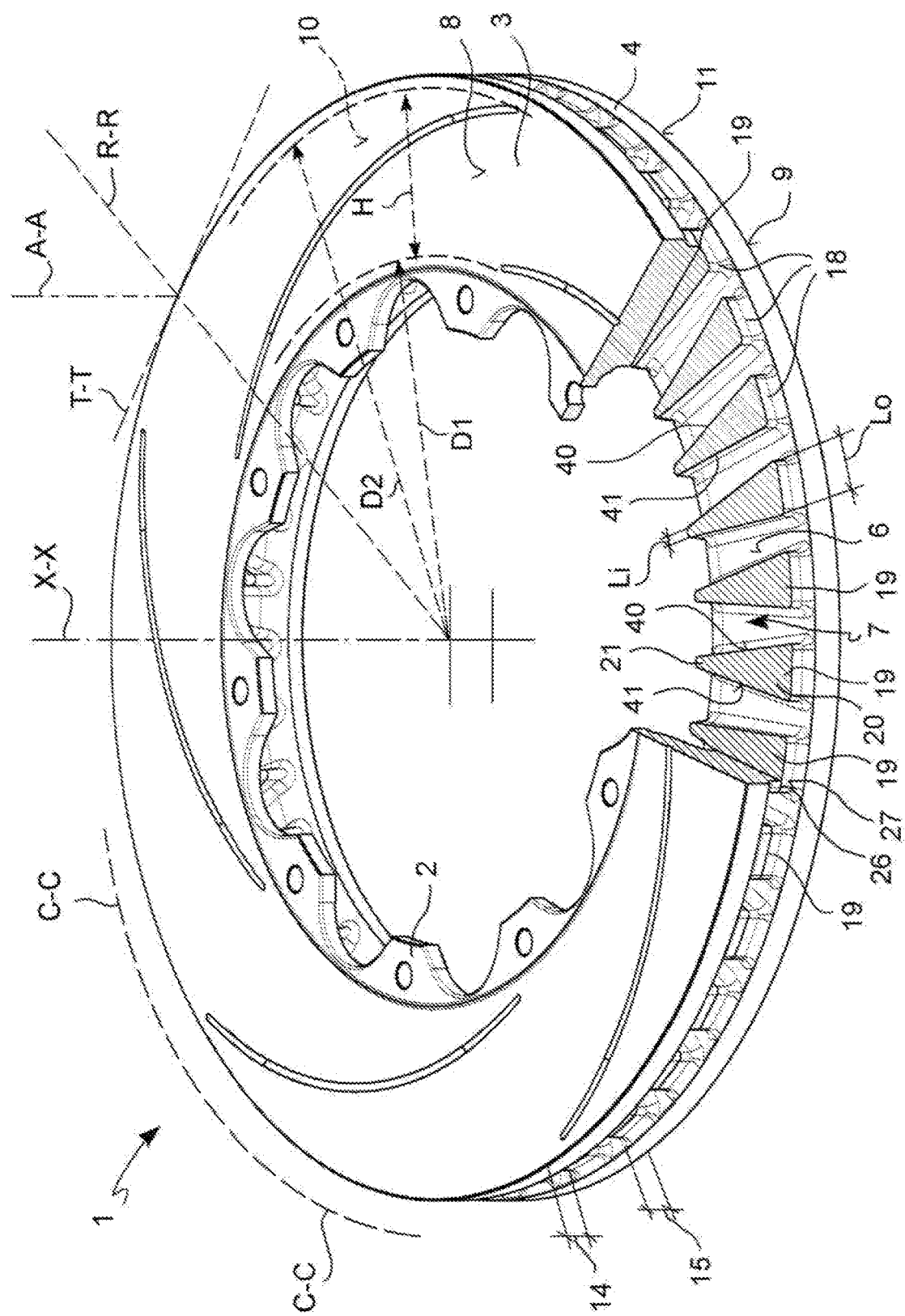
FIG. 10 is a partially sectioned axonometric view of a disc brake disc with a braking band according to the present invention.
Figure 11:
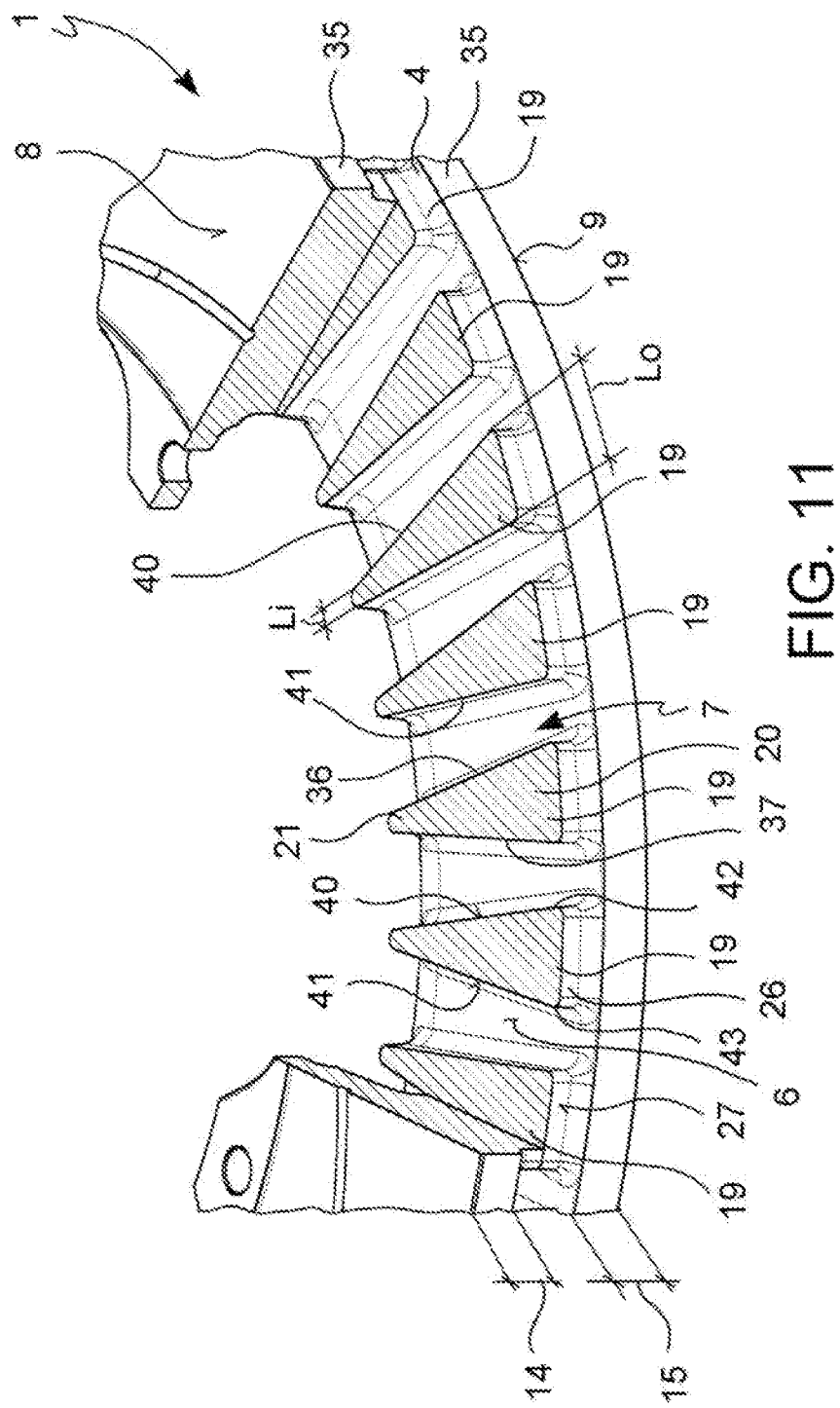
FIG. 11 is an axonometric view of an enlarged detail of the braking band section in FIG. 10, showing the tapered fins with rectilinear sides, forming a substantially triangular fin cross-section.
Figure 12:
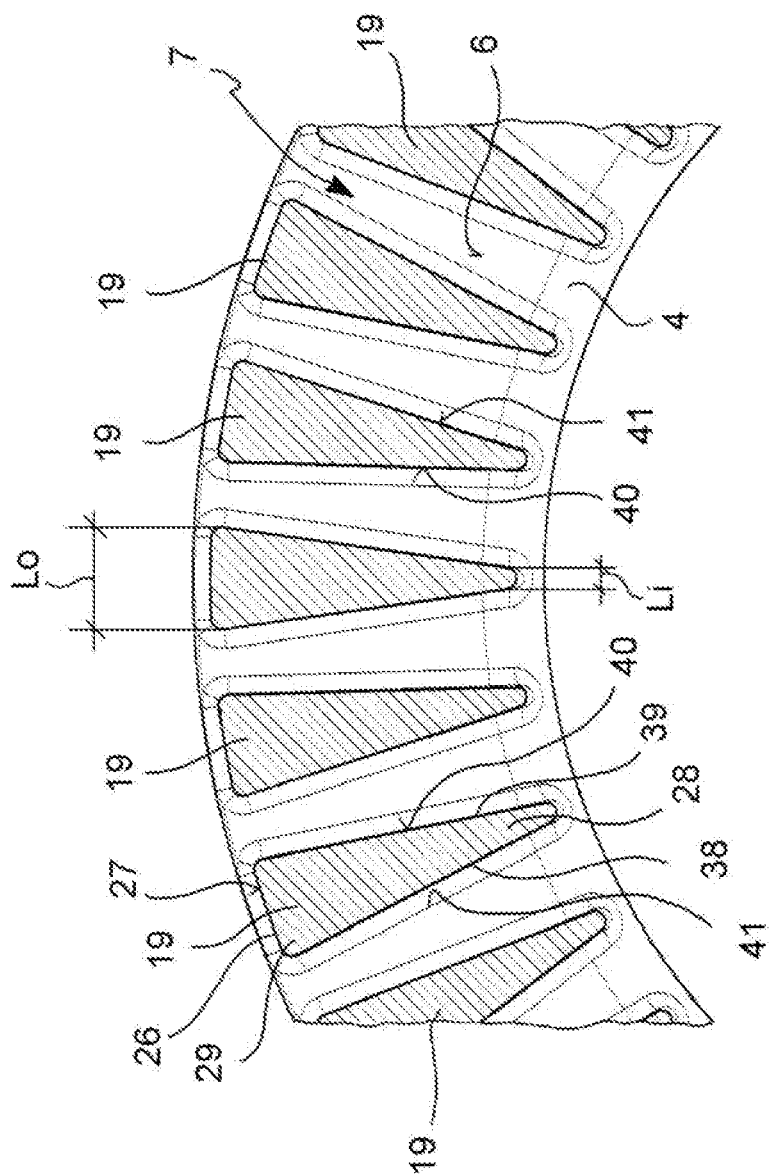
FIG. 12 shows a sectioned plan view taken along a medium plane of fluid flow through the gap of the braking band in FIG. 10.
Figure 13:
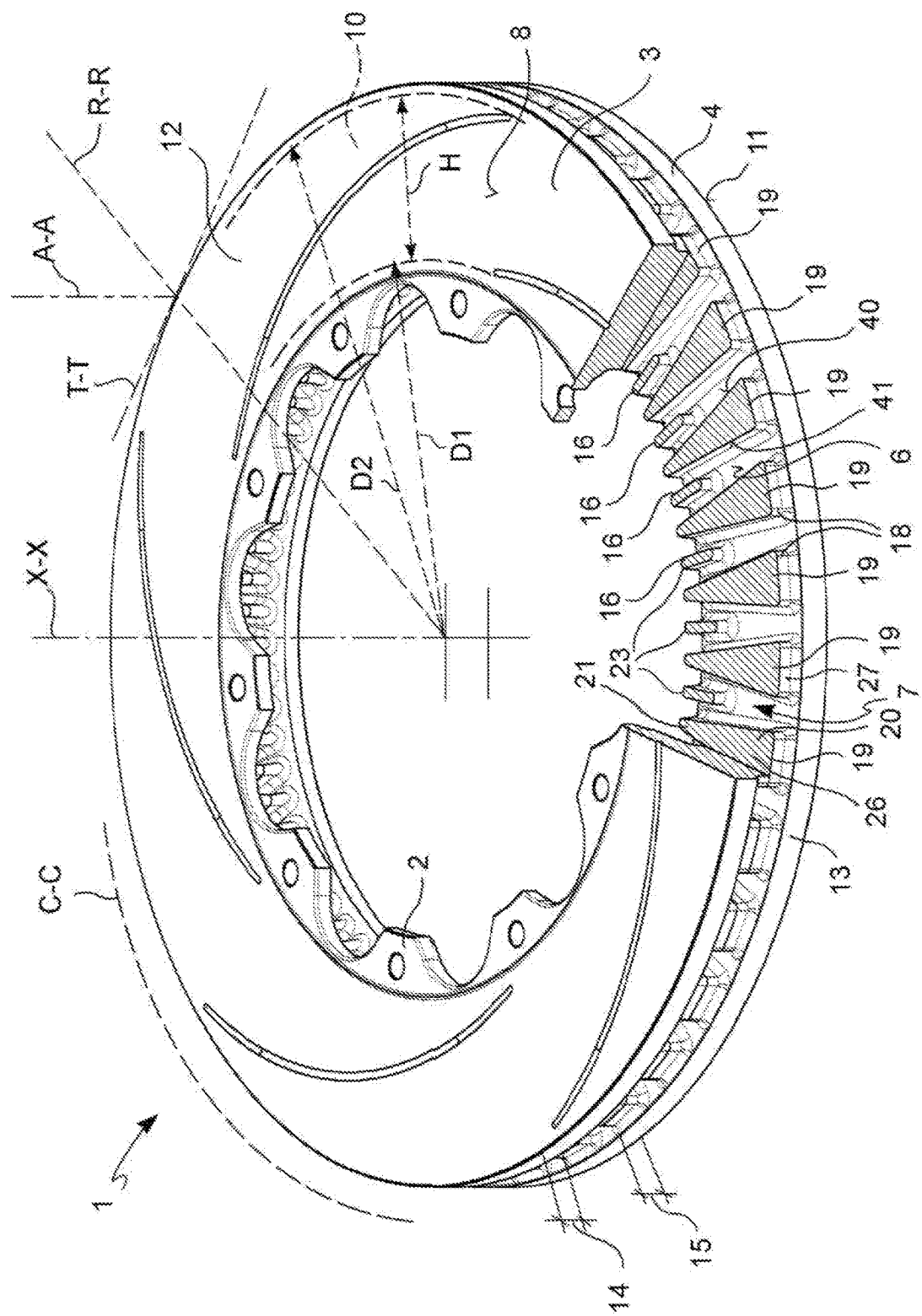
FIG. 13 is a partially sectioned axonometric view of a disc brake disc with a braking band according to the present invention.
Figure 14:
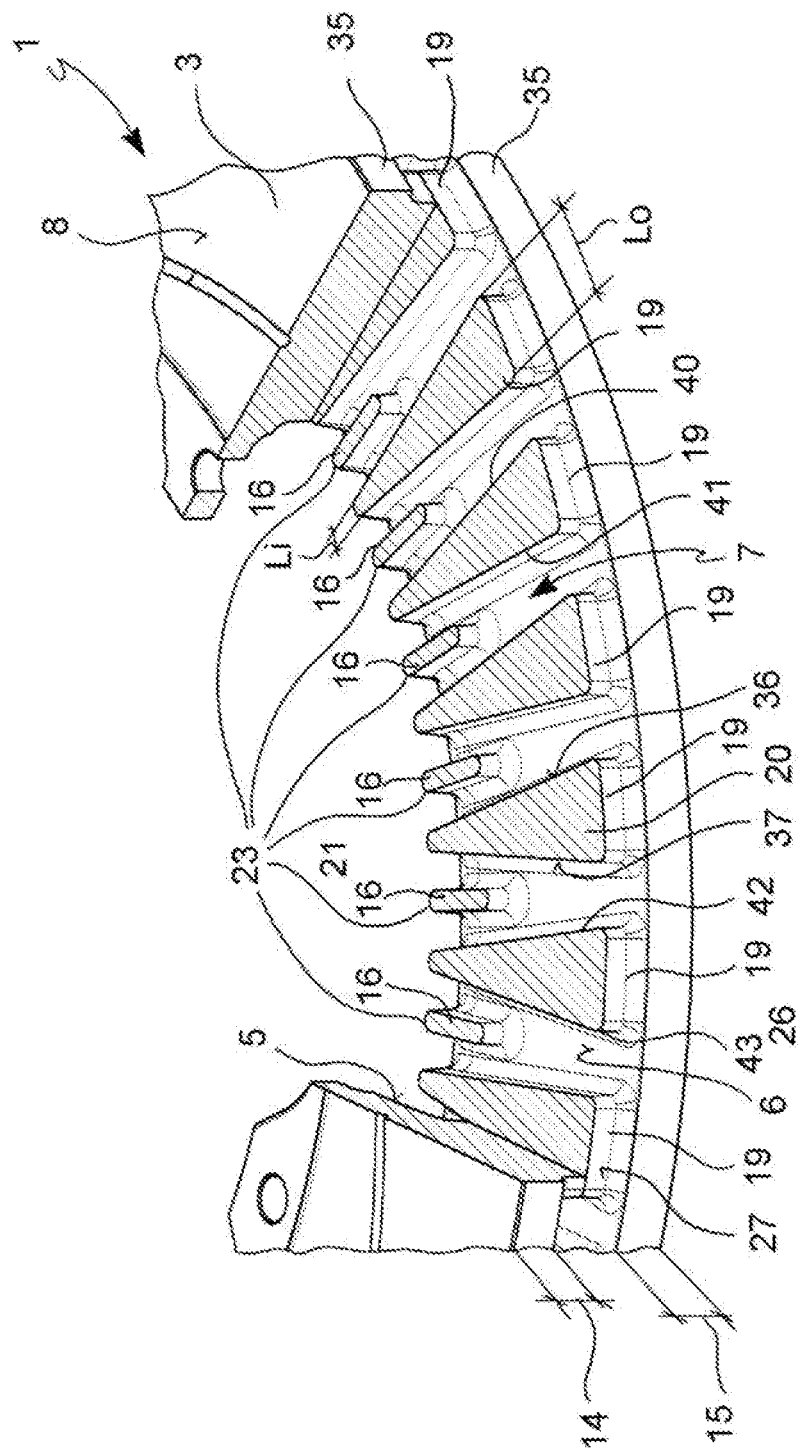
FIG. 14 is an axonometric view of an enlarged detail of the braking band section in FIG. 13, showing the tapered fins with recliner sides, thus forming a substantially triangular fin cross-section and interposed short fins with extension limited to at most ⅓ of the band height.
Figure 15:
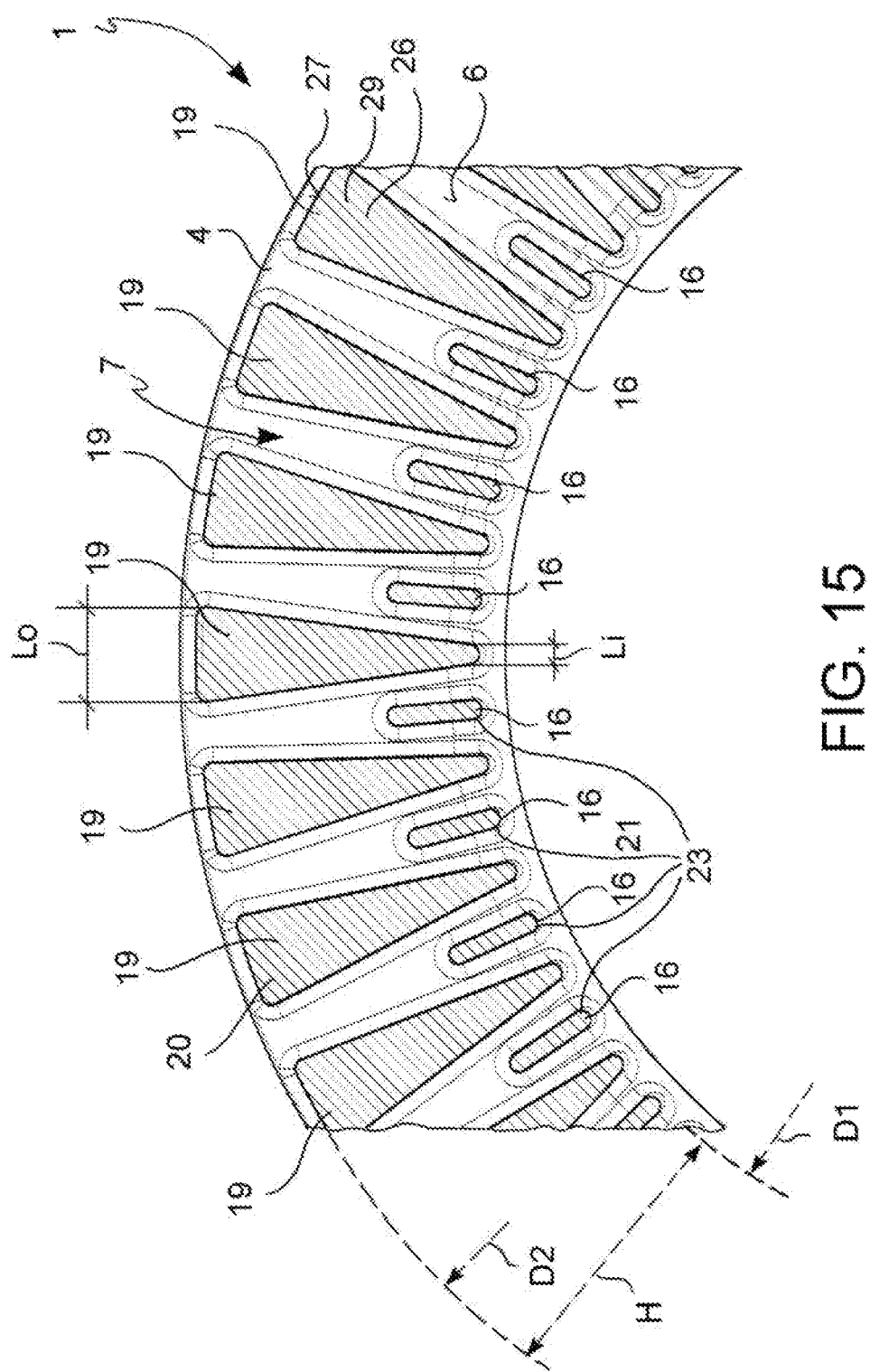
FIG. 15 shows a sectioned plan view taken along a medium plane of fluid flow through the gap of the braking band in FIG. 13.

According to a general embodiment, a braking band 1 of a disc for a disc brake 2 of the ventilated type is provided.

Said braking band 1 extends between an inner diameter D1, near a rotation axis X-X of the braking band 1, and an outer diameter D2, far from said rotation axis X-X. Said rotation axis defines an axial direction X-X.

Said braking band 1 defines a radial direction R-R, which is substantially orthogonal to said axial direction X-X, and a circumferential direction C-C which is orthogonal both to said axial direction X-X and to said radial direction R-R.

Said braking band 1 comprises two plates 3, 4 facing each other.

Said plates 3, 4 comprise inner surfaces 5, 6, either directly or indirectly facing each other and delimiting a gap 7 which defines a ventilation conduit for the braking band 1.

Said plates 3, 4 comprising outer surfaces 8, 9.

Said outer surfaces 8, 9 comprise opposite flat circumferential portions, which form braking surfaces 10, 11. In other words, portions of the outer surfaces 8, 9 cooperate with brake pads housed in a brake caliper to apply a braking action when sandwiched against the braking band 1. The portion of the outer surfaces 8, 9 which is brushed or concerned by the pads defines the braking surfaces 10, 11.

Said plates 3, 4 comprise a plate body 12, 13 having an extension in axial direction X-X or plate thickness 14, 15. In other words, when observed in an axial direction, each plate 3, 4 shows a plate thickness 14, 15 which is given by the thickness in the axial direction of the plate body 12 of the plate 3, 4.

Said plates 3, 4 are joined to each other by heat dissipation elements or connecting elements 16, 17, 19 of the plates 3, 4.

Said connecting elements 16, 17, 19 are shaped as ribs, which project from one plate towards the opposite plate in the shape of connecting bridges of the plates 3, 4.

Advantageously, at least one first series of fins 18 of said connecting elements is each a fin 19, which is in a single piece and extends from near said inner diameter D1 to near said outer diameter D2.

Each of said fins 19 of said first series of fins 18 comprises a fin outer end portion 20 located near said outer diameter D1.

Said fin outer end portion 20 of said fin 19 comprises a predetermined extension along the outer circumferential direction, i.e. an outer circumferential width Lo.

Said fin 19 comprises a fin inner end portion 21 placed near said inner diameter D1.

Said fin inner end portion 21 of said fin 19 comprises a predetermined extension along the inner circumferential direction, i.e. an inner circumferential width Li.

Advantageously, considering a section taken along a section plane comprising a radial R-R and circumferential C-C direction, section made by passing through a mean air flow point which runs through said gap, said outer circumferential width Lo is greater than said inner circumferential width Li.

With further advantage, said fin outer end portion 20 of said each fin 19 of said first series of fins 18 faces only an adjacent fin 19 of said first series of fins 18 on both sides in circumferential direction C-C.

According to an embodiment, said at least one fin 19 comprises an outer radial end 26. Said outer radial end 26 forms a base surface 27. Said base surface 27 comprises a circumferential extension having straight extension or extended arc extension parallel to the outer edge of the braking band 1 which defines said outer diameter D2.

According to an embodiment, said at least one fin 19 comprises a shank portion 28 which extends away from said inner diameter D1. Said shank portion 28 is delimited by two mutually opposite sides 38, 39; wherein at least one of said shank sides 38, 39 comprises at least one shank straight stretch 40.

According to an embodiment, said at least one fin 19 comprises a shank portion 28 which extends away from said inner diameter D1; said shank portion 28 is delimited by two mutually opposite sides 38, 39; wherein both of said shank sides 38, 39 comprise mutually opposite shank straight stretches 40, 41.

According to an embodiment, said at least one fin 19 comprises a shank portion 28 which extends away from said inner diameter D1; said shank portion 28 is delimited by two mutually opposite sides 38, 39; wherein said shank sides 38, 39 comprise mutually opposite curved shank sections 44, 45, so as to taper the extension of said fin 19 passing from said outer diameter D2 to said outer diameter D1 in a more than linear manner.

According to an embodiment, said at least one fin 19 comprises an outer radial portion 29 arranged near the fin outer end portion 20 of said fin 19.

According to an embodiment, said at least one fin 19 comprises a fin shank portion 28 arranged near the fin inner end portion 21 of said fin 19.

According to an embodiment, in a section taken along a section plane comprising a radial R-R and circumferential C-C direction, section made by passing through a mean air flow point which runs through said gap, a section edge or perimeter of said fin 19 from said outer radial portion 29 is connected to said shank portion 28.

According to an embodiment, said outer radial portion 29 is tapered passing near said outer diameter D2 and going towards said inner diameter D1.

According to an embodiment, said outer radial portion 29 is tapered and connected to said shank portion 28.

According to an embodiment, in a section taken along a section plane comprising a radial R-R and circumferential C-C direction, section made by passing through a mean air flow point which runs through said gap, a section edge or perimeter of said fin 19 has a triangular shape.

According to an embodiment, said at least one fin 19 comprises fin connectors 22 which connect said fin 19 to said inner surfaces 5, 6 of said plate 3, 4.

According to an embodiment, said braking band 1 comprises at least one connecting element 16, 17 which connects said plates 3, 4 and comprises an extension in radial direction R-R lower than the band height H, i.e. at the radial distance between said inner diameter D1 and said outer diameter D2; said connection element being named short fin 16, 17.

According to an embodiment, said at least one short fin 16 is arranged directly facing at least one fin 19 near said inner diameter D1 and extends radially going towards said outer diameter D2 for an extension not greater than ⅓ of the height of the distance between said inner diameter D1 and said outer diameter D2 or band height.

According to an embodiment, said at least one short fin 16 is a plurality of short fins 16 which form a second series of short fins 23.

According to an embodiment, said at least one short fin 16 is a plurality of short fins 16 which form a second series of short fins 23 each distributed between two fins 19 of said first series of fins 18.

According to an embodiment, said braking band 1 comprises at least one connecting element 16, 17 which connects said plates 3, 4 and comprises an extension in radial direction R-R lower than the band height H, i.e. at the radial distance between said inner diameter D1 and said outer diameter D2; said connection element being named short fin 16, 17.

According to an embodiment, said at least one short fin 17 is arranged directly facing at least one fin 19 near said inner diameter D1 and extends radially going towards said outer diameter D2 for an extension not greater than ½ of the height of the distance between said inner diameter D1 and said outer diameter D2 or band height H.

According to an embodiment, said at least one short fin 17 is a plurality of short fins 17 which form a third series of short fins 24.

According to an embodiment, said at least one short fin 16 is a plurality of short fins 17 which form a third series of short fins 24 each distributed between two fins 19 of said first series of fins 18.

According to an embodiment, said at least one short fin 16, 17 comprises a width in circumferential direction C-C, substantially constant along all its prevalent extension in radial direction R-R.

According to an embodiment, said braking band 19 comprises at least two short fins 16 or 17.

According to an embodiment, said at least two short fins 16 or 17 are arranged directly facing said at least one fin 19 on opposite sides 36, 37 thereof.

According to an embodiment, said at least one short fin 16, 17 comprises a width in circumferential direction C-C, substantially constant along all its prevalent extension in radial direction R-R.

According to an embodiment, said braking band 19 comprises at least two short fins 16 or 17.

According to an embodiment, said at least two short fins 16 or 17 are arranged directly facing said at least one fin 19 on opposite sides 36, 37 thereof.

According to an embodiment, each fin 19 has at least one short fin 16 or 17 facing each of its opposite sides 36, 37.

According to an embodiment, said braking band 1 comprises a plurality of pins 19.

According to an embodiment, said plurality of fins 19 is arranged circumferentially in a uniform manner along said gap 7.

According to an embodiment, said fins 19 are thirty-seven fins 19 distributed circumferentially in a uniform manner along said gap 7.

According to an embodiment, said fins 19 are thirty-seven fins 19 distributed circumferentially in uniform manner along said gap 7 and a short fin 16 or 17 is arranged between each pair of adjacent fins 19 for a total of thirty-seven short fins.

The present invention further relates to a disc brake disc 2 comprising a braking band 1 as defined by any one of the embodiments described above and a bell 33 associated with said braking band 1 and adapted to connect to a wheel hub of a vehicle.

The present invention further relates to a vehicle comprising a disc brake disc 2 as defined above.

An embodiment of the present invention is described by way of non-limiting example below.

According to an embodiment, a braking band 1 has an outer diameter D2 of 400 mm, an inner diameter D1 of 264 mm, and a thickness of 36 mm.

The two plates 3, 4 are connected by short fin-shaped connecting elements 16 or 17 and said connecting elements 16 or 17 are distributed in a uniform manner along the circumferential direction near the inner diameter D1.

Fins 19 are distributed circumferentially in uniform manner, extended for the entire height of the gap 7 and arranged at intervals between the short fins 16 or 17, i.e. on both sides of each one of them.

There are 37 short fins 16 or 17. There are 37 fins.

The short fins have dimensions L=4 mm and radial length of 20 mm (short fins 16) 34.5 mm (short fins 17).

The fins have dimensions $L_o$=20 mm, $L_i$=4 mm and radial length of 60 mm.

The modal analysis performed in a frequency range from 20 to 10,000 Hz (with material having a Young modulus of 123,700 MPa a Poisson ratio of 0.250 and a density of 7.205 kg/dm$^3$) presented the following values of interest compared with the solution described in EP 2 715 179 B1 by Applicant:

|  | Mode K(0; 3) |
|---|---|
| 1 projection band disc frequency [Hz] according to EP 2 715 179 B1 | 1692 |
| 2 projection band disc frequency [Hz] according to the present invention (amplitude reduction and separation of the single high sound peak into 2 lower ones) | 1664 and 2812 |

LIST OF REFERENCES

1 braking band
2 disc brake disc
3 plate
4 plate
5 inner surface
6 inner surface
7 gap
8 outer surface
9 outer surface
10 braking surface
11 braking surface
12 plate body
13 plate body
14 plate thickness
15 plate thickness
16 short fin at at most ⅓ of band height
17 short fin at at most ½ of band height
18 first set of fins
19 extended fin-shaped connecting elements for full band height
20 fin outer end portion
21 fin inner end portion
23 second set of fins—short fins at most ⅓
24 third series of fins—short fins at most ½
26 fin outer radial end
27 outer radial end base surface
28 fin shank portion
29 fin outer radial portion
33 bell
35 outer band edge
36 fin side
37 opposite fin side
38 shank side
39 opposite shank side
40 shank rectilinear stretch
41 shank rectilinear stretch
42 outer radial portion side
43 outer radial portion opposite side
44 shank curvilinear stretch
45 shank curvilinear stretch
A-A braking band or brake disc rotation axis
X-X rotation axis or axial direction
R-R radial direction
C-C circumferential direction
T-T tangential direction
D1 inner band diameter
D2 outer band diameter
Lo fin outer circumferential width
Li fin inner circumferential width
H band height

The invention claimed is:

1. A braking band of a disc for a disc brake of ventilated type, said braking band extending between an inner diameter, near a rotation axis (X-X) of the braking band, and an outer diameter, far from said rotation axis (X-X), said rotation axis defining an axial direction (X-X);

said braking band defining a radial direction (R-R), orthogonal to said axial direction (X-X), and a circumferential direction (C-C), orthogonal to said axial direction (X-X) and to said radial direction (R-R), and a tangential direction (T-T) orthogonal to said axial direction (X-X) and radial direction (R-R);

said braking band comprising two mutually facing plates;

said two mutually facing plates comprising inner surfaces, either directly or indirectly facing and delimiting a gap;

said two mutually facing plates being joined to each other by connecting elements;

said connecting elements projecting from one of the two mutually facing plates and reaching the opposite plate, thereby forming bridges connecting the two mutually facing plates to each other;

wherein a first series of fins of said connecting elements is each a fin which is in a single piece and extends from near said inner diameter to near said outer diameter;

each fin of said first series of fins comprises a fin outer end portion located near said outer diameter;

the fin outer end portion comprises a predetermined extension along an outer circumferential width;

each fin of said first series of fins comprises a fin inner end portion located near said inner diameter;

said fin inner end portion comprises a predetermined extension along an inner circumferential width;

wherein considering a section taken along a section plane comprising the radial direction (R-R) and the circumferential (C-C) direction, the section made by passing through a mean air flow point that runs through said gap, said outer circumferential width is greater than said inner circumferential width; and wherein said fin outer end portion of each fin of said first series of fins faces only an adjacent fin of said first series of fins on both sides in the circumferential direction (C-C);

wherein said braking band comprises at least one further connecting element which connects said plates and comprises an extension in radial direction (R-R) lower than the band height, said connection element being at least one short fin, wherein said at least one short fin is arranged directly facing at least one fin near said inner diameter and extends radially going towards said outer diameter for an extension not greater than ⅓ of the height of the distance between said inner diameter and said outer diameter or band height.

2. The braking band of claim 1, wherein said fin comprises an outer radial end; said outer radial end forms a base surface; and said base surface comprises a circumferential extension having straight extension or extended arc extension parallel to an outer edge of the braking band defining said outer diameter.

3. The braking band of claim 1, wherein at least one of the following alternatives is provided:
said fin comprises a shank portion that extends away from said inner diameter, said shank portion is delimited by two mutually opposite shank sides, wherein at least one of said shank sides comprises at least one shank straight stretch;
said fin comprises a shank portion that extends away from said inner diameter, said shank portion is delimited by two mutually opposite shank sides, wherein both shank sides comprise mutually opposite shank straight stretches;
said fin comprises a shank portion that extends away from said inner diameter, said shank portion is delimited by two mutually opposite shank sides, wherein said shank sides comprise mutually opposite curved shank sections to taper an extension of said fin passing from said outer diameter to said inner diameter in a more than linear manner.

4. The braking band of claim 1, wherein
said fin comprises an outer radial portion arranged near said fin outer end portion;
said fin comprises a fin shank portion arranged near said fin inner end portion; and
at least one of the following alternatives is provided:
in a section taken along a section plane comprising the radial direction (R-R) and the circumferential direction (C-C), the section made by passing through a mean air flow point which runs through said gap, a section edge or perimeter of said fin from said outer radial portion is connected to said fin shank portion;
said outer radial portion is tapered passing near said outer diameter and going towards said inner diameter;
said outer radial portion is tapered and connected to said fin shank portion;
in a section taken along a section plane comprising the radial direction (R-R) and the circumferential direction (C-C), the section made by passing through a mean air flow point which runs through said gap, a section edge or perimeter of said fin has a triangular shape.

5. The braking band of claim 1, wherein said fin comprises fin connectors that connect said fin to said inner surfaces of said two mutually facing plates.

6. The braking band of the claim 1, wherein
said at least one short fin is a plurality of short fins forming a second series of short fins;
or wherein
said at least one short fin is a plurality of short fins forming a second series of short fins, each short fin distributed between two fins of said first series of fins.

7. The braking band of claim 6, wherein
said at least one short fin comprises a width in the circumferential direction (C-C), substantially constant along all its prevalent extension in the radial direction (R-R);
or wherein
said braking band comprises at least two short fins and wherein said at least two short fins are arranged directly facing said at least one fin of said first series of fins on opposite sides thereof.

8. The braking band of claim 6, wherein
said at least one short fin comprises a width in the circumferential direction (C-C), substantially constant along all its prevalent extension in the radial direction (R-R);
or wherein
said braking band comprises at least two short fins and wherein said at least two short fins are arranged directly facing said at least one fin of said first series of fins on opposite sides thereof;
and/or wherein
each fin of said first series of fins has at least one short fin facing each of its opposite sides.

9. The braking band of claim 1, wherein
said braking band comprises a plurality of fins; and
at least one of the following alternatives is provided:
said plurality of fins is arranged circumferentially in uniform manner along said gap;
said fins are thirty-seven fins distributed circumferentially in uniform manner along said gap;
said fins are thirty-seven fins distributed circumferentially in uniform manner along said gap and a short fin is arranged between each pair of adjacent fins of said first series of fins for a total of thirty-seven short fins.

10. A disc brake disc comprising a braking band according to claim 1 and a bell associated with said braking band and configured to connect to a wheel hub of a vehicle.

11. A vehicle comprising a disc brake disc according to claim 10.

* * * * *